US010964000B2

(12) United States Patent
Oh et al.

(10) Patent No.: US 10,964,000 B2
(45) Date of Patent: Mar. 30, 2021

(54) TECHNIQUES FOR REDUCING NOISE IN VIDEO

(71) Applicant: NVIDIA Corporation, Santa Clara, CA (US)

(72) Inventors: Seungseok Oh, Fremont, CA (US); Sean Pieper, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 120 days.

(21) Appl. No.: 16/279,668

(22) Filed: Feb. 19, 2019

(65) Prior Publication Data

US 2020/0027202 A1   Jan. 23, 2020

Related U.S. Application Data

(60) Provisional application No. 62/699,214, filed on Jul. 17, 2018.

(51) Int. Cl.
*H04N 5/357* (2011.01)
*G06T 5/20* (2006.01)
*G06T 1/20* (2006.01)

(52) U.S. Cl.
CPC .............. *G06T 5/20* (2013.01); *G06T 1/20* (2013.01); *H04N 5/357* (2013.01)

(58) Field of Classification Search
CPC .............. G06T 5/20; G06T 1/20; H04N 5/357
USPC ......................................................... 348/607
See application file for complete search history.

(56) References Cited

U.S. PATENT DOCUMENTS

| | | | |
|---|---|---|---|
| 2007/0014368 A1* | 1/2007 | MacInnis | H04N 19/521 375/240.24 |
| 2008/0204600 A1* | 8/2008 | Xu | H04N 5/21 348/607 |
| 2010/0073569 A1* | 3/2010 | Zhong | G06T 5/002 348/607 |
| 2011/0019093 A1* | 1/2011 | Zhong | G06T 5/002 348/607 |
| 2016/0284060 A1* | 9/2016 | Allagadapa | G06T 5/002 |
| 2016/0330371 A1* | 11/2016 | Toyoda | G06T 5/002 |

OTHER PUBLICATIONS

Lee et al., "A Spatiotemporal Denoising Scheme for a Mobile Device", 2015 IEEE $5^{th}$ International Conference on Consumer Electronics Berlin (ICCE-Berlin), pp. 240-242.

(Continued)

*Primary Examiner* — Michael Lee
(74) *Attorney, Agent, or Firm* — Nixon & Vanderhye, P.C.

(57) ABSTRACT

Systems and techniques for noise reduction in video are described. Example implementations provide improved motion-adaptive temporal or spatio-temporal noise reduction that use an improved blending of the current frame with previous frames. The improved blending may be particularly effective for processing video captured in noisy environments such as low-light and/or mobile environments. In some example implementations, the improved blending is based on more accurately distinguishing between pixel difference in adjacent images that are caused by motion rather than noise.

22 Claims, 14 Drawing Sheets

(56) References Cited

OTHER PUBLICATIONS

Yoo et al., "Spatial-Temporal Noise Reduction Filter for Image Devices", International Conference on Control, Automation and Systems 2008, Oct. 14-17, 2008 in COEX, Seoul, Korea, pp. 982-987.

Yahya et al. "Video Noise Reduction Method Using Adaptive Spatial-Temporal Filtering", Hindawi Publishing Corporation, Discrete Dynamics in Nature and Society, vol. 2015, Article ID 351763, pp. 1-10.

* cited by examiner

TECHNIQUES FOR REDUCING NOISE IN VIDEO

CROSS-REFERENCE TO RELATED APPLICATIONS

This application claims priority to U.S. Provisional Patent Application No. 62/699,214, filed on Jul. 17, 2018, titled "Spatio-Temporal Noise Reduction", the entire content of which is herein incorporated by reference.

TECHNICAL FIELD

This disclosure relates to video processing, more particularly to systems and methods using motion-adaptive temporal noise reduction (TNR) techniques on video.

BACKGROUND

Video capture is an important use-case for many types of computers such as, for example, smartphones and tablet devices. Mobile video captures can suffer from a high degree of sensor noise, especially in non-ideal lighting conditions. Processing the video to reduce the noise from the sensor can significantly improve the quality of the overall video capture that is supplied to applications or displays.

As cameras are increasingly deployed in applications such as automotive applications, intelligent video analytics applications, etc., where the video capture environment in which the cameras operate may often be in low light conditions (e.g., night scenes, unilluminated areas, bad weather, etc.) and/or include mobile video capture, it is desirable that the camera pipeline suppresses noise well even in very low lighting conditions and other noisy conditions.

Temporal noise reduction (TNR) suppresses such noise by blending one or more previous frames into the current frame. TNR is often combined with spatial filtering as well, and such combined techniques are referred to as spatio-temporal noise reduction (STNR) or 3-D noise reduction. Motion-compensated TNR or motion-compensated STNR, which blends the current frame with one or more previous frames after registering them, can deliver superior noise suppression while keeping ghosting artifacts small, but suffers from a computational complexity that is too high for efficient implementation. For example, LEE et al, "A spatio-temporal denoising scheme for a mobile device", in 2015 IEEE 5th International Conference on Consumer Electronics-Berlin (ICCE-Berlin) (pp. 240-242), describes a conventional technique to perform pyramidal global and local motion estimation followed by bilateral temporal filtering, that incurs high computational complexity.

As an alternative, low complexity motion-adaptive TNR/STNR techniques are sometimes used. Low complexity motion-adaptive TNR/STNR techniques blend frames without considering actual motion, considering only whether there is motion between the two frames at the corresponding pixel. The low complexity techniques simply measure how different each pixel is from the previous frame. Big differences are assumed to be caused by motion or actual image content changes and accordingly the blending from the previous frames is reduced. Small differences are assumed to be caused by noise and accordingly the blending from the previous frames is increased. Two such conventional low complexity techniques are described in Yoo et al, "Spatial-temporal noise reduction filter for image devices", in 2008 International Conference on Control, Automation and Systems, pp. 982-987, and Yahya et al, "Video Noise Reduction Method Using Adaptive Spatial-Temporal Filtering", Discrete Dynamics in Nature and Society, 2015, pp. 1-10. Yoo et al (2008) performs global motion compensation and then applies temporal filtering. Yahya el al (2015) applies spatial Wiener filtering and then temporal filtering.

Thus, as described above, the conventional techniques for video noise reduction are particularly deficient at operating with low light and/or other noise-prone video captures. Therefore, improved and efficient video noise reduction techniques are desired.

SUMMARY

Example embodiments rectify some of the deficiencies of the techniques described above for video noise reduction. Methods, computer readable mediums, and systems are disclosed for providing temporal or spatio-temporal motion-adaptive video noise reduction.

According to an example embodiment, a method of video noise reduction comprises determining a difference metric for a frame of a sequence of video frames, determining a blending factor for blending the frame with another frame of the sequence using the determined difference metric, and blending the frame and the other frame according to the determined blending factor. The determining the blending factor includes at least one of (a) determining the blending factor jointly for a plurality of color channels, (b) non-linearly associating the determined difference metric with the blending factor, (c) restricting the determined blending factor to a maximum value determined according to a noise variance in the other frame, (d) restricting the determined blending factor to a maximum value based on a previous blending factor, and (e) changing a value of the blending factor according to one or more dynamically configurable coefficients.

According to another example embodiment a system comprising at least one graphics processing unit (GPU) is configured to receive a sequence of video frames from a video producer and perform video noise reduction operations. The video noise reduction operations comprise determining a difference metric for a frame of the sequence of video frames, determining a blending factor for blending the frame with another frame of the sequence using the determined difference metric, and blending the frame and the other frame according to the determined blending factor. The determining the blending factor includes at least one of (a) determining the blending factor jointly for a plurality of color channels, (b) non-linearly associating the determined difference metric with the blending factor, (c) restricting the determined blending factor to a maximum value determined according to a noise variance in the other frame, (d) restricting the determined blending factor to a maximum value based on a previous blending factor, and (e) changing a value of the blending factor according to one or more dynamically configurable coefficients.

Another example embodiment provides a non-transitory computer readable storage medium storing instructions that, when executed by at least one processor, causes the at least one processor to perform operations comprising determining a difference metric for a frame of a sequence of video frames, determining a blending factor for blending the frame with another frame of the sequence using the determined difference metric, and blending the frame and the other frame according to the determined blending factor. The determining the blending factor includes (a) determining the blending factor jointly for a plurality of color channels and/or (b) non-linearly associating the determined difference metric with the blending factor and/or (c) restricting the determined blending factor to a maximum value determined according to a noise variance in the other frame and/or (d) restricting the determined blending factor to a maximum value based on a previous blending factor and/or (e) changing a value of the blending factor according to one or more dynamically configurable coefficients.

DETAILED DESCRIPTION

Figure 1A:
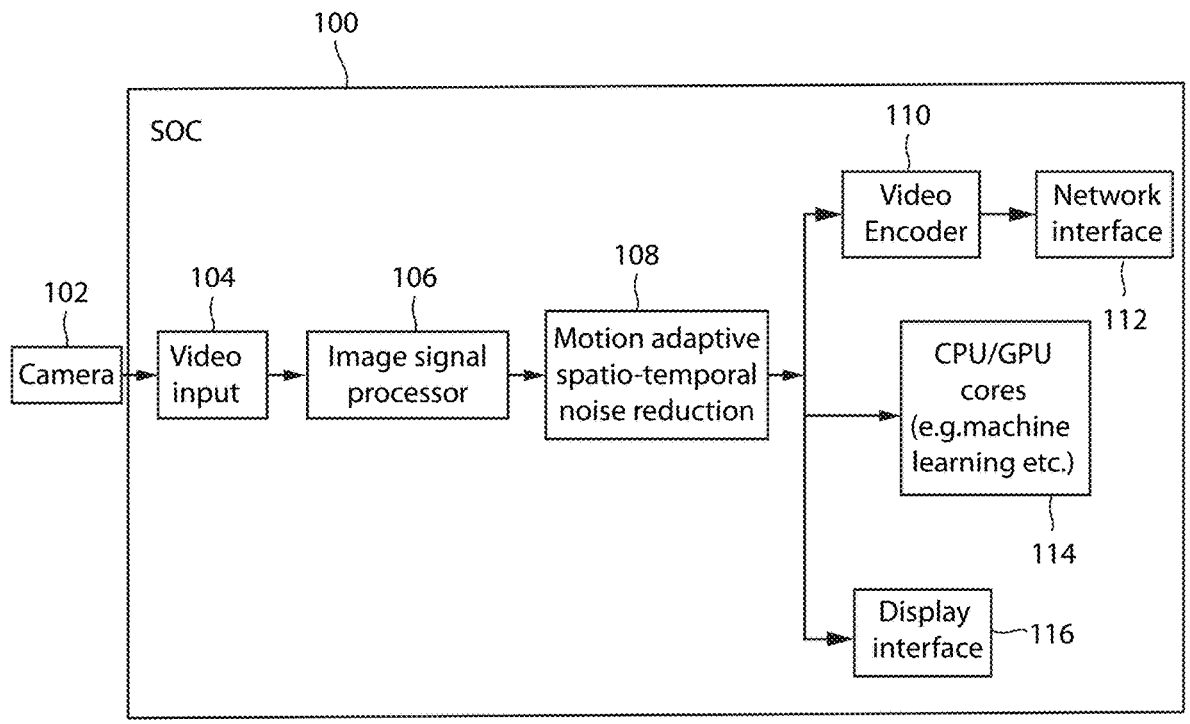
FIG. 1A illustrates a block diagram of a video noise reduction system on a system-on-a-chip, according to certain example embodiments.

Certain example embodiments of the present invention efficiently process noisy video captures acquired under various sub-optimal capture conditions such as, for example, low light conditions, mobile environments, weather events, night scenes, etc. The low complexity motion-adaptive temporal and spatio-temporal filtering noise reduction mechanisms of example embodiments, adapt efficiently to video content and ambient lighting conditions. Certain example embodiments can be used to reduce noise in captured video not only in the encoded captured video but also in the camera preview as well.

Embodiments provide systems and methods for reducing noise in video frames using motion-adaptive temporal or spatio-temporal noise reduction processing. The systems and methods are particularly advantageous for processing video acquired in noisy capture environments such as, for example, low light environments. The systems and methods of example embodiments provide improved noise reduction by, among other things, effectively distinguishing differences in successive frames that occur due to motion and differences that are due to noise.

Example embodiments may substantially improve upon the amount and accuracy of noise reduction provided by conventional temporal noise reduction systems. For example, whereas some current processing platforms (e.g., such as the Nvidia Tegra™ chip) include a temporal video noise reduction pipeline that includes a spatial filtering component, a motion detection component, a temporal filtering component, and a frame combiner component that combines the temporally filtered frame with the spatially filtered frame, the improvements described in this disclosure can improve the noise reduction performance of such known temporal video noise reduction pipelines.

For example, a known temporal video noise reduction pipeline relies upon the sum of absolute difference (SAD) between pixels of the current and previous frames as the difference metric based on which to detect motion. The SAD values are used to calculate a blending factor (referred to herein as "alpha") that controls the blending of the current and previous frames (SAD and alpha are described in more detail below). If a particular pixel has high motion, then the correlation between the current pixel and co-located pixel in the previous frame would be low, which leads SAD values higher, and thus alpha values lower. Lower alpha values leads to less blending of previous frames. However, it has been observed that large SAD does not necessarily mean it is a result of motion. Strong noise can also make SAD large which makes alpha blending of temporal noise reduction weaker. Especially, in very low lighting conditions, noise is often strong enough to go beyond the range the motion rejection logic of a noise reduction pipeline would consider as noise. Thus, the temporal noise reduction algorithm in the known temporal video noise reduction pipeline may be less effective where it is needed more.

Some example embodiments may improve processing platforms such as, but not limited to, video noise reduction pipelines such as the above described known temporal video noise reduction pipeline and associated methods to make motion-adaptive temporal noise reduction that provide better noise suppression (e.g., greater noise suppression, more accurate noise suppression, etc.) while keeping ghosting at acceptable levels.

Systems for Temporal/Spatio-Temporal Noise Reduction in Video

FIG. 1A illustrates a system 100 that performs temporal or spatio-temporal processing to reduce noise in video frames, according to some example embodiments. The system 100 may be a system-on-a-chip (SoC) including one or more central processing units (CPUs) and/or graphic processing units (GPUs).

The SoC 100 includes a video input interface 104, an image signal processing (ISP) block 106, a motion-adaptive temporal/spatio-temporal noise reduction processing block 108. A video frame sequence from a camera 102 or other video generation device is received by the video input interface 104. The sequence of frames is then processed in the ISP 106 before being input to the motion-adaptive temporal/spatio-temporal noise reduction processing block 108 for reduction of noise in the video frames. The motion-adaptive temporal/spatio-temporal noise reduction processing block 108 may be referred to hereafter as the "noise reduction block" 108.

Example embodiments are not limited to any particular type of camera 102 and/or any particular format of the video received from the camera 102. Moreover, embodiments are not limited to any particular video capture environment. However, the advantages and superior performance of certain example embodiments may be particularly substantial (compared to conventional approaches) when performing noise reduction in video captured in noisy environments such as, for example, low light environments.

Figure 2A:
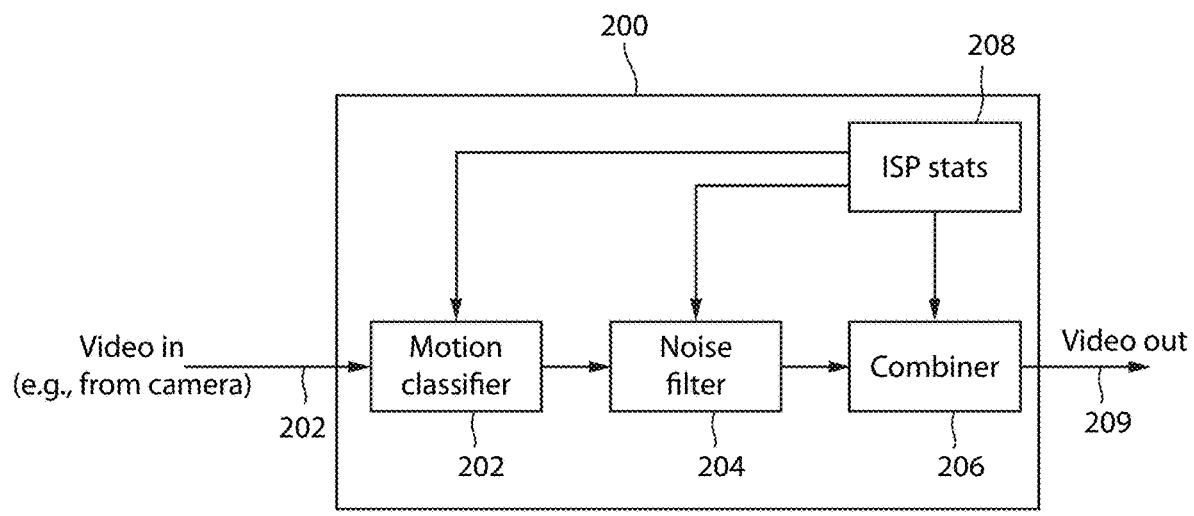
FIG. 2A is a high level block diagram of a video noise reduction circuit, according to some example embodiments.
Figure 2B:
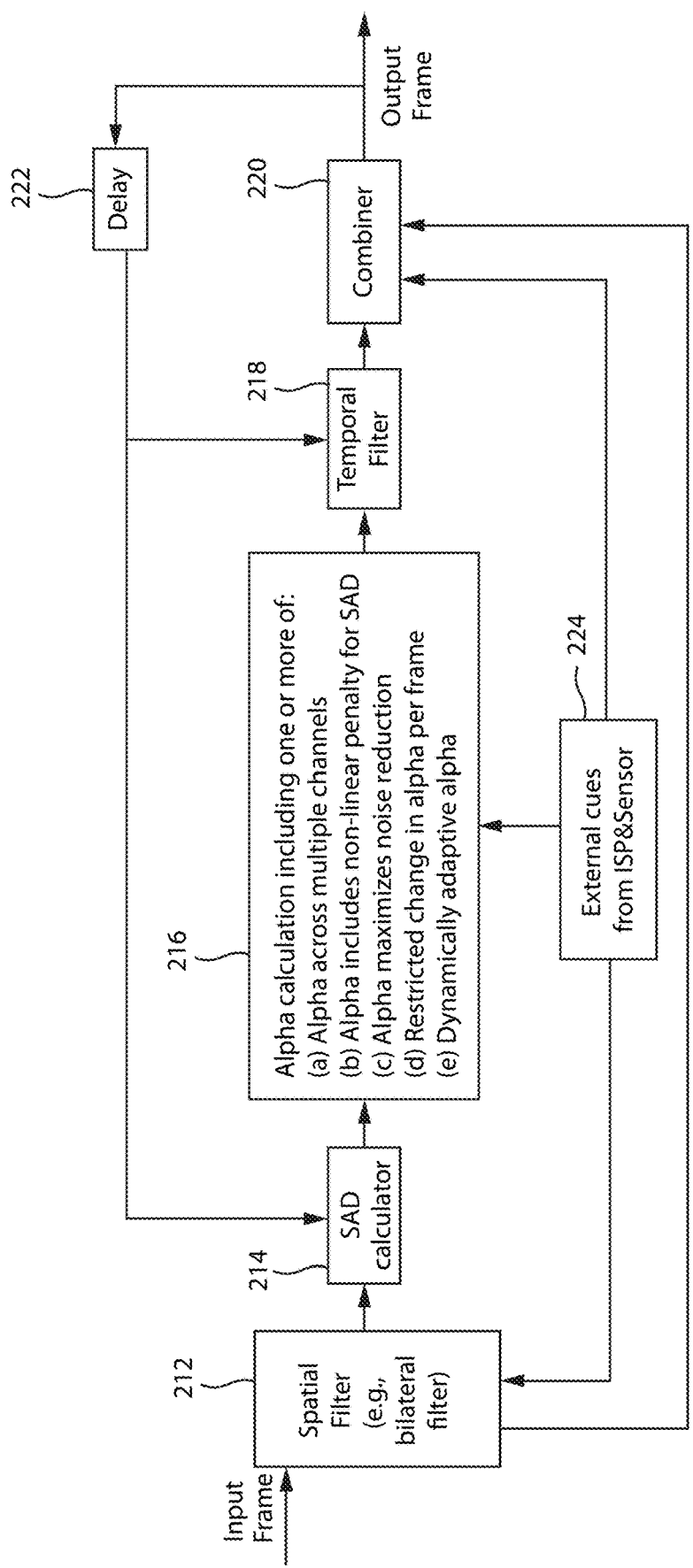
FIG. 2B is a more detailed block diagram of the video noise reduction circuit shown in FIG. 2A, according to some example embodiments.
Figure 2C:
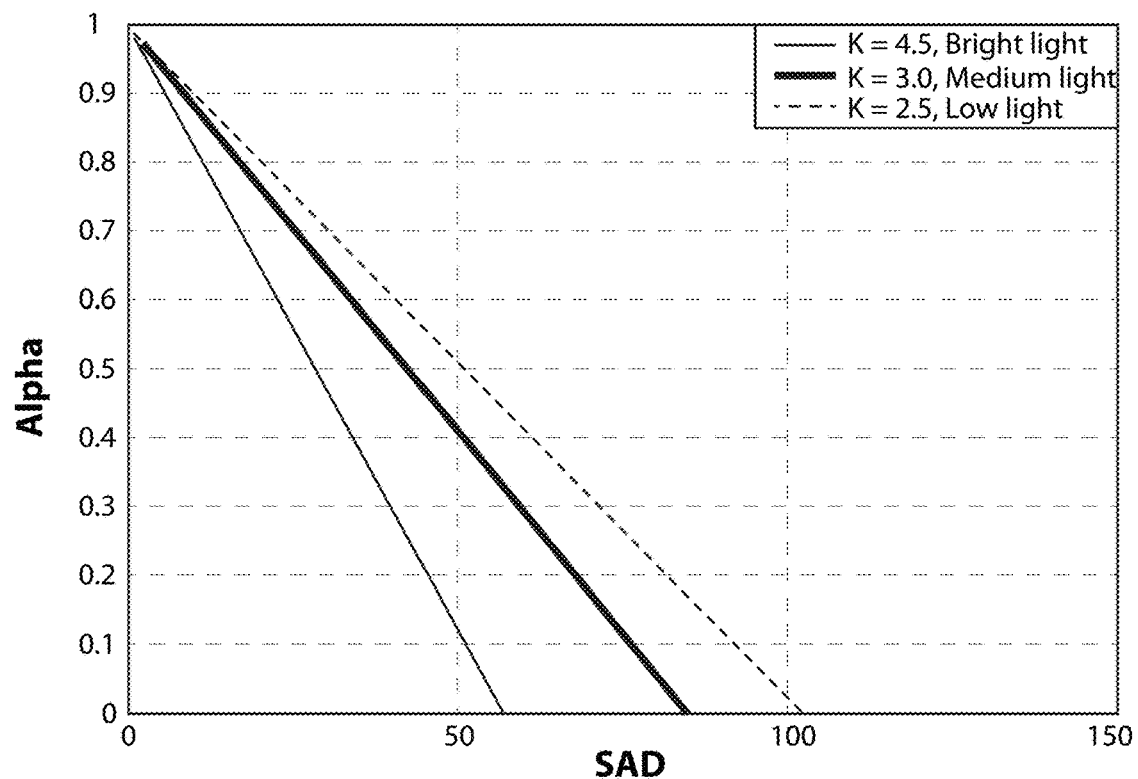
FIG. 2C illustrates techniques for selecting some constants associated with a control parameter for temporal filtering in the video noise reduction circuit, according to some example embodiments.
Figure 2D:
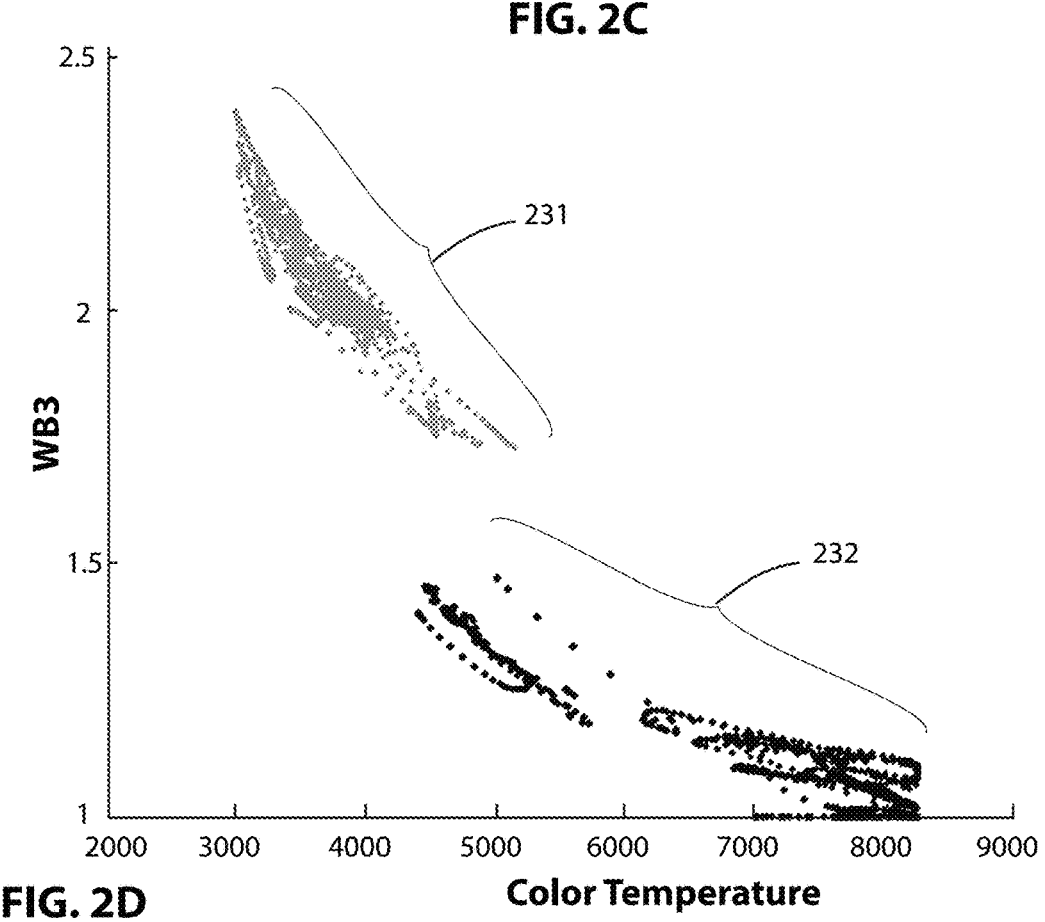
FIG. 2D is an example clustering of a channel's white balance gain, according to some example embodiments.
Figure 2E:
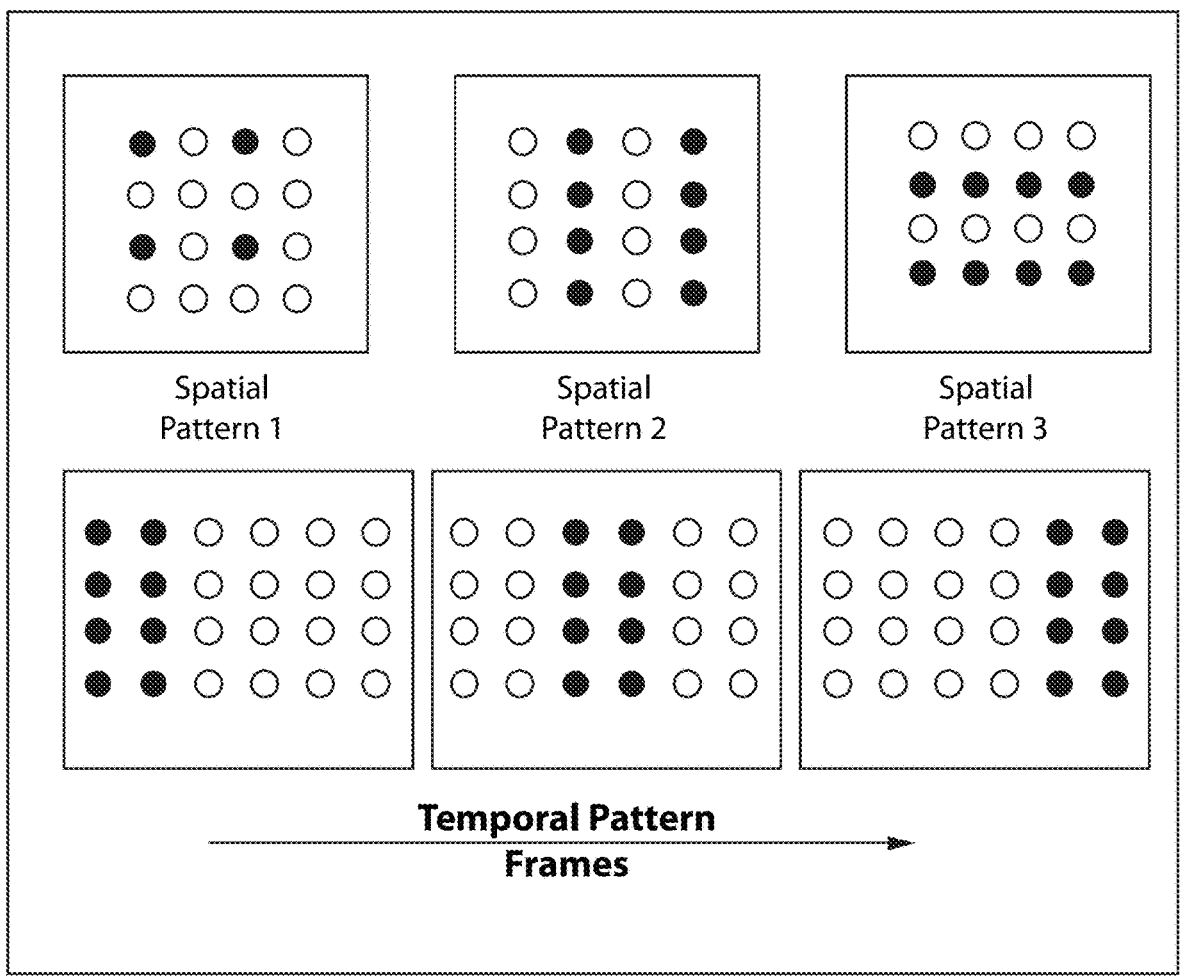
FIG. 2E illustrates some example pixel patterns for controlling complexity, according to some example embodiments.
Figure 2F:
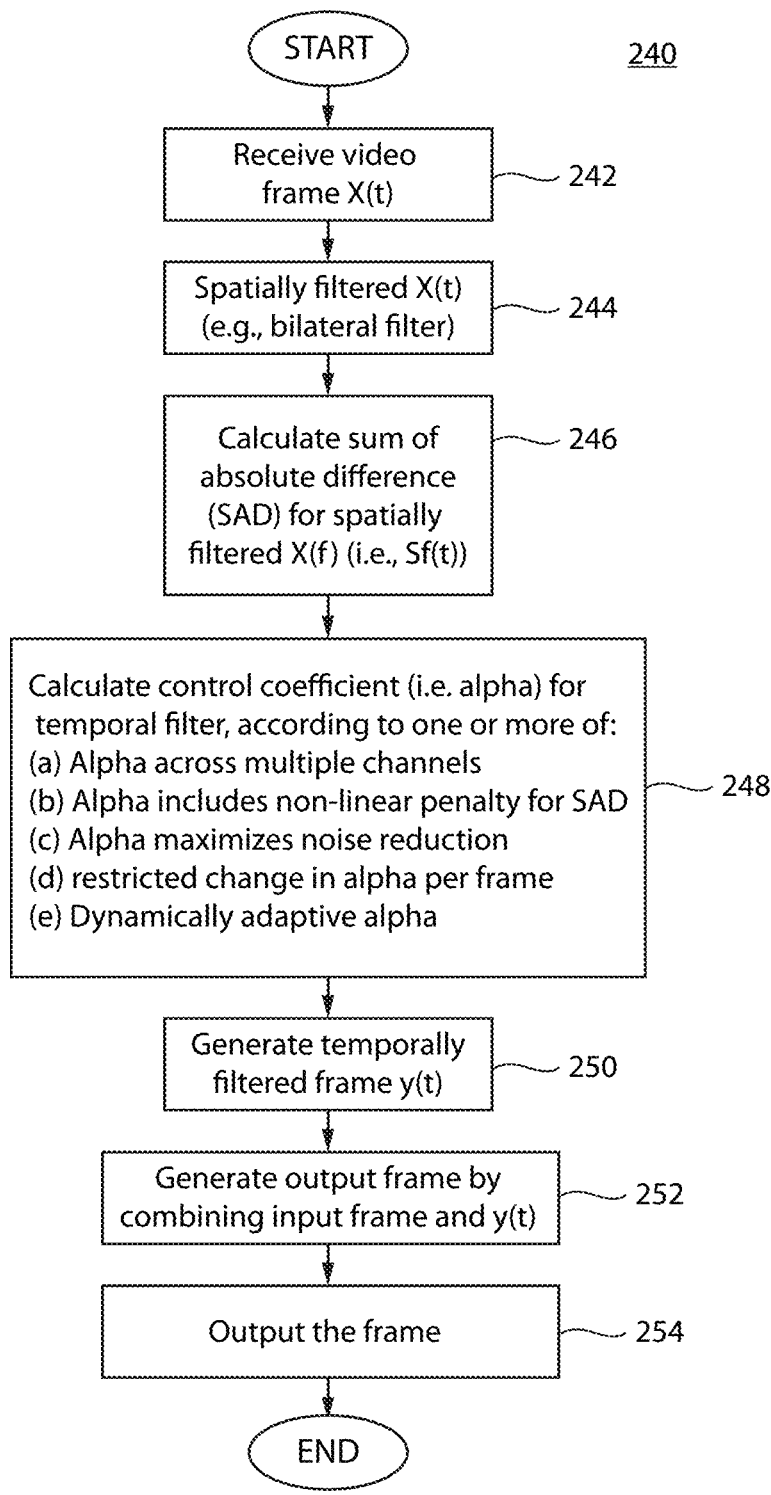
FIG. 2F show a flowchart of a process for video noise reduction, according to some example embodiments.

The noise reduction block 108 is further described in relation to the circuits shown in FIGS. 2A, 2B and the process described in relation to FIG. 2F.

The SoC 100 also includes one or more of a video encoder 110, CPU and/or GPU cores 114 for processing video frames, and a display interface 116 connectable to a display device to display the video frames or previews of the video frames. The noise-reduced sequence of video frames that are output from block 108 is provided to at least one of, the video encoder 110, CPU/GPU cores 114 and display interface 116.

The video encoder 110 may operate to encode the video received from the noise reduction block 108 according to any one or more of a plurality of predetermined video encoding formats. Before transmitting a video frame to the network from a frame buffer of the SoC 100, the video frame may be encoded using a codec 108 such as, but not limited to, H.264 or HEVC.

The encoded video may be transmitted to a video consumer via a network interface 112. The video consumer may be, for example, an external video player, set-top box, gaming console, personal computer, mobile computing device, smartphone, smart television, video surveillance analysis servers etc. According to some embodiments, the video frames and optionally associated audio information may be included by the interface 112 in several packets that each include protocol header information for protocols such as H.264, RTP/RTCP, and TCP/UDP.

In some embodiments, one or more CPU and/or GPU cores 114 may operate to receive the noise-reduced video frames from noise reduction block 108. The CPU and/or GPU cores may process the noise-reduced video in various applications. One example application may be a machine learning application. For example, the machine learning application may be part of a smart city application that processes input video from a street camera potentially under low light conditions for facial recognition, people counting, anomaly detection, and the like. In another example, the machine learning may be part of an autonomous vehicle control system that processes video input from one or more cameras mounted on the vehicle. The CPU and/or GPU 114 may also, in another example embodiment, may process the noise-reduced video from the noise reduction block 108 in an intelligent video analytics (IVA) application. Although the processing in CPU and/or GPU 114 is described in this paragraph in relation to a selected group of applications, embodiments are not limited to the described applications. The SoC 100 may be used in the processing of video input from any type of video producer for any type of application.

In some embodiments, the noise-reduced video frames from noise reduction block 108 may be provided to a display screen (not shown) via a display interface 116. Embodiments are not limited to any particular type of display interface 116 and/or display screen.

By providing to any of the blocks 110, 114, and 116, video that has already been subjected to effective temporal or spatio-temporal noise reduction, example embodiments enable more efficient processing of the encoder 110 (e.g., lowering bitrates required for video encoding), CPU/GPU cores 114 and display interface 116.

Figure 1B:
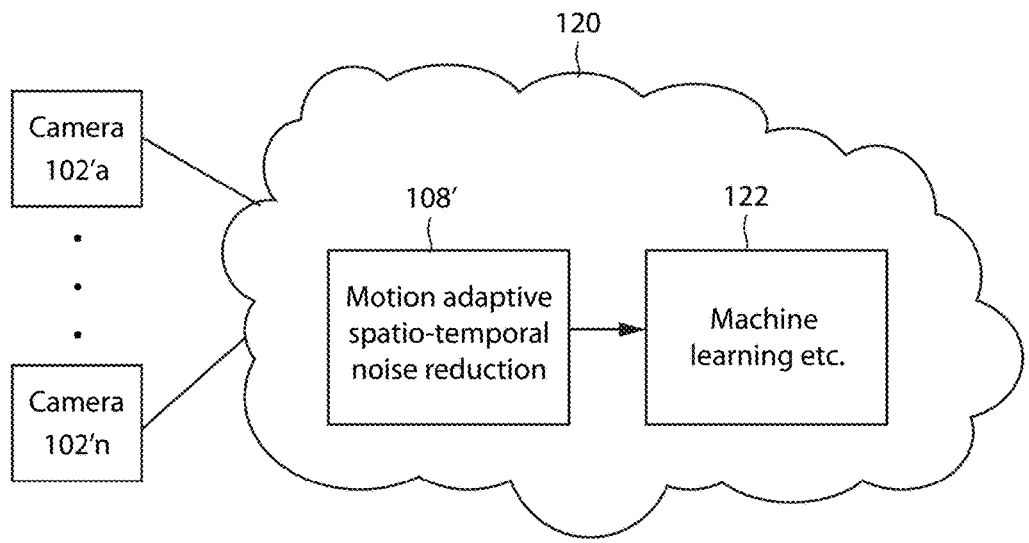
FIG. 1B illustrates a block diagram of a video noise reduction system in a cloud environment, according to some example embodiments.

FIG. 1B illustrates a system in which a GPU cloud 120 performs noise reduction processing on video inputs received from one or more cameras 102'$a$, ..., 102'$n$, according to some embodiments. In some embodiments, cameras 102'$a$ ..., 102'$n$ may be cameras that are the same or similar to camera 102 described above in relation to FIG. 1A. The cameras 102' may be communicatively connected to the GPU cloud 120 over the Internet or another communication infrastructure. The GPU cloud 120 may include a plurality of interconnected GPUs and CPUs, and may optionally include other processors/accelerators. The GPU cloud 120 may, in some embodiments, be included in a cloud infrastructure such as, but not limited to, Amazon Web Services™ (AWS), Microsoft Azure™, etc.

The video from the cameras are received in the GPU cloud 120 and processed by one or more processors in at least one noise reductions block 108'. The output from the noise reduction block 108' may be processed by another video frame processing application 122, such as, for example, a machine learning application. As described above, example applications 122 may include autonomous vehicles control, smart city applications, IVA, etc. In an environment such as the GPU cloud 120, an application 122 may receive video input from a large number of cameras that may be geographically distributed and subject to differing recording conditions. Reduction of noise in the input video may be of substantial importance for applications 122 such as those noted above because they may receive and process video from a large number of cameras that record under significantly different recording conditions (e.g., such as significantly different light conditions, and the like).

Figure 1C:
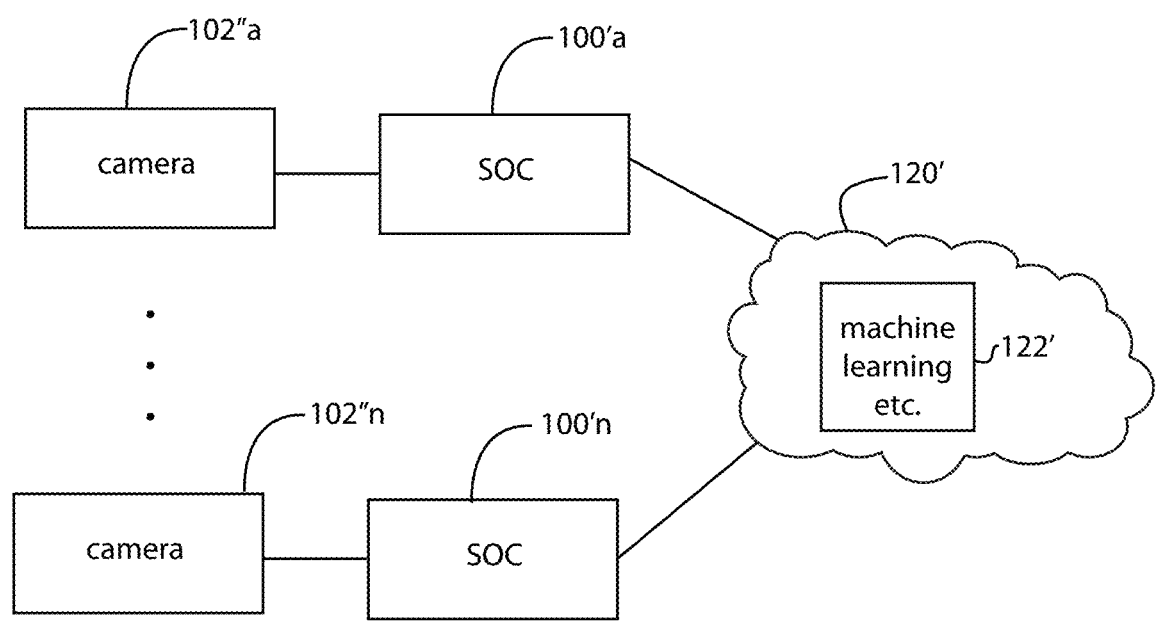
FIG. 1C illustrates a block diagram of a remote video surveillance system with video noise reduction in a cloud environment, according to some example embodiments.

The effective noise reduction provided in embodiments to input video streams, and in particular, to high noise (e.g., low light) environment video captures, enables providing cleaner (i.e., having less noise) video frames to applications 122. The capability to provide cleaner video to applications may improve the efficiency with which the application processes the video frames and may also improve the accuracy of various applications (e.g. object detection) that use the video. It may also improve bandwidth utilization between at least the noise reduction blocks (e.g., 108 and/or 108') and the application. Such improvement in noise reduction may be particularly advantageous in embodiments such as that shown in FIG. 1C. The system of distributed cameras 102"$a$ ... $n$ and SoC 100'$a$ ... $n$ shown in FIG. 1C may be used for remote video surveillance. Each SoC 100'$a$ ... $n$, like SoC 100, includes a noise reduction block (e.g. similar to noise reduction block 108 or 108') which receives input video from one or more cameras 102"$a$ ... $n$ and outputs cleaner video that is transmitted over a network 120' to an application 122'. In an example embodiment, the cleaner video output from each SoC 100'$a$ ... $n$ helps improve bandwidth utilization between the respective SoC 100'$a$ ... $n$ that may be geographically distributed and the application 122' which may be centrally-located in network 120'.

FIG. 2A shows a preprocessing logic arrangement in a video capture pipeline, according to certain example embodiments. Especially in low light conditions, noisy data from a camera block (e.g., video input from camera 102 and/or video input interface 104) when not corrected by a pre-processor block 200, may go to a preview and/or to a video encoder. Noise reduction, such as that provided by the example embodiments, may improve the preview user experience (e.g. video preview on a box camera) and may also reduce encoding artifacts in the final capture of video output. If the noise is not reduced, the video encoder that generates the final capture may be forced to consume a significant portion of the bitrate to the noise, thereby utilizing less bitrate to code the actual video features. Hence, suppression of noise prior to encoding is an important operation which not only assures noise-reduced output, but also preserves important image structure and features present in the original video.

FIG. 2A shows, arranged within the preprocessor block 200, a block level view of a noise reduction system, according to some example embodiments. The preprocessor block 200 operates to reduce noise in input video 201. Statistics from an image signal processor (ISP) 208 (and/or sensors) can include a wealth of information about ambient lighting conditions and other information about the video capture environment. These statistics can be used in classification of motion in the input scene (performed by a motion classifier 202), adaptation of the noise filter 204 parameters and/or in combining (performed by the combiner) the noise-reduced data to produce a visually pleasing video output 209. The noise filter in addition, may adapt to motion information obtained from the classifier.

The TNR/STNR techniques of certain example embodiments include methods to adjust temporal blending factors to strengthen noise reduction effects while reducing ghosting artifacts. In particular, certain example embodiments, improve a noise reduction processing pipeline which includes temporal processing (such as, for example, the known temporal video noise reduction circuit referred to above), by introducing one or more of the following: determining alpha across multiple channels rather than individually for each channel, including a non-linear penalty for a motion detection metric in the calculation of alpha, determining alpha to maximize noise reduction, restricting the amount of change in alpha per frame, and enabling dynamic adapting of alpha in response to the environment. The blending factor, alpha, was described above, and it may be considered as a control parameter for the blending of the current frame and one or more previous output frames.

According to some embodiments, the motion-adaptive noise reduction pipeline including a spatial processing block and a temporal processing block in a GPU is improved by the introduction of one of, or any combination of: (a) determining alpha across multiple channels rather than individually for each channel, (b) including a non-linear penalty for SAD in the calculation of alpha, (c) determining alpha to maximize noise reduction, (d) restricting the amount of change in alpha per frame, and (e) enabling dynamic adapting of alpha in response to the environment.

The feature of alpha calculation across multiple channels ((a) above) is an improvement. When calculating alpha in the conventional techniques, each channel (e.g. red, green and blue color channels in an RGB format, luma and chroma color channels in a YUV format) is treated as a separate image. Thus, each channel calculates its own alpha and uses it for blending the channel. Thus, in conventional techniques, a substantial change in the value of a pixel in a single channel can significantly affect the blending even if the other channels do not have substantial changes in value. In certain example embodiments of the present invention, all channels are considered together when calculating alpha for a pixel. That is, a common alpha value is calculated for all or multiple channels. This helps in at least two ways. First, the SAD estimation is more robust because the effect of noise in one channel is reduced by averaging across multiple channels. Second, more information from all (or several) channels are utilized to decide whether there are changes in image content on the pixel.

The feature of introducing a nonlinear penalty for SAD in the alpha calculation ((b) above) is also an improvement. When calculating alpha in the conventional techniques, the SAD is linearly penalized by the formula: alpha=max(0, 1−K*SAD). In contrast, certain example embodiments use a quadratic penalty: alpha=max(0, 1−K*SAD$^2$). Low SAD could be from either motion or noise, while very high SAD is likely to be caused by motion. The quadratic penalty penalizes high SAD values, which very likely are due to motion, more severely than the linear penalty, and can help reducing ghosting artifacts. It should be understood that embodiments are not limited to a linear or quadratic penalty. This feature may be generalized to any nonlinear penalty, such as, any higher-order (e.g. quadratic or greater) penalty.

Some embodiments may also employ a bilateral filter for spatial filtering. In low lighting, shot noise is often so strong that it often goes beyond the range that the motion detector considers as noise. This problem can be alleviated by using more sophisticated spatial filters, such as, for example, a bilateral filter. Bilateral filters can be used in some embodiments because of their superior noise suppression performance, edge-preserving properties, and efficient computation. In contrast to a linear filter such as a Wiener filter (or a Gaussian filter or a box filter) used in some known noise reduction pipelines, a bilateral filter can operate to mix pixels in neighborhood (e.g. a 3×3 or 5×5 neighborhood) based on their distance from the center pixel and their pixel value difference from the center value. The output of the bilateral filter may feed the output combiner (e.g. which combines the temporally filtered frame with the spatially filtered current frame) with a better spatial image input.

Some embodiments may control blending of the current and previous frames in order to maximize noise reduction ((c) above). In some conventional techniques, alpha is determined without considering how to maximize noise reduction, i.e. how to minimize noise variance. For example, in some conventional techniques, if the previous output was noisy and alpha for the current frame is close to 1, the current frame may be substantially replaced with the noisy previous output.

In certain example embodiments, the potential of replacing the current frame with a noisy previous output is reduced by limiting alpha to a predetermined maximum value, denoted alpha_max, which is deemed to achieve minimum noise variance. Accordingly, some example embodiments keep alpha(t) at or below alpha_max to prevent increase of the noise variance. For example, consider variance Var[y(t−1)] to be the noise variance of a previous output frame for a certain pixel. From the temporal filter formula, y(t)=alpha(t)*y(t−1)+(1−alpha(t)*x(t), it follows that Var[y(t)]=alpha(t)$^2$*Var[y(t−1)]+(1−alpha(t))$^2$*Var[x(t)], where it may be assumed that the noise in the previous frame output is uncorrelated with the noise in the current input frame, i.e. E[y(t−1) x(t)]=0. Then, Var[y(t)] is minimized when alpha(t) is at alpha_max(t)=Var[x(t)]/(Var[x(t)]+Var[y(t−1)]).

Assuming that Var[x(t)] is not time-varying, it may be denoted that $c(t-1)=\text{Var}[y(t-1)]/\text{Var}[x(t)]$. Then, the update formula can be expressed as $$\text{alpha\_max}(t)=1/(1+c(t-1))$$

$$\text{alpha}(t)=\min(\text{alpha\_max}(t),\text{alpha\_hat}(t))$$

$$c(t)=\text{alpha}(t)^2*c(t-1)+(1-\text{alpha}(t))^2 \quad \text{(Eq. V1)}$$

where c and alpha are initialized with $c(0)=1$, $\text{alpha}(0)=0$, respectively, and alpha_hat(t) is the original alpha value calculated with the SAD. Note that although the noise variance can be calculated directly as the square of the average difference between pixel values and mean pixel value, some embodiments calculate the noise variance as in Eq. V1 by updating c(t) from the previous c(t−1) and the current alpha(t). As c(t) is proportional to Var[y(t)], this enables the embodiments to keep track of the noise variance via c(t).

The above computation, however, may require writing/reading c(t−1) to/from memory, thereby increasing memory requirements and making a potentially negative impact on memory bandwidth and power efficiency. In some embodiments, the memory requirement to keep c(t−1) in memory may be reduced by spatial downsampling and/or precision reduction. For downsampling, some embodiments may use 2×2 averaging which provides a reduced bandwidth increase with only slight decrease in the results. For precision reduction, some embodiments may use a reduced number of bits. The blending may not substantially degrade image quality with some degree of numerical precision reduction in c( ). For example, saving $d(t-1)=\text{constant}/c(t-1)$ instead of saving c(t−1) directly, may be feasible as c( ) is approximately inverse proportional to the number of blended frames, if alpha(t) is constant or changing smoothly. The above computation, with the associated downsampling and/or precision reduction, provides low computational complexity. For example, the above computation uses a simple update formula rather than estimating noise variances.

Variations are also possible in the above computation. In a first variation, a record of N( ), the number of good frames to have been blended, may be maintained instead of c( ). Then, the update formulas may be simpler:

$$\text{alpha\_max}(t)=N(t-1)/(1+N(t-1))$$

$$\text{alpha}(t)=\min(\text{alpha\_max}(t),\text{alpha\_hat}(t))$$

$$N(t)=N(t-1)+1 \quad \text{(Eq. V2)}$$

where c and alpha are initialized with $N(0)=0$, $\text{alpha}(0)=0$. In this case, because $1/(1+N(t-1))$ is practically flat for high N( ) (e.g., 8), embodiments may only use 3 or 4 bits to save N( ).

In a second variation, the schedule of how alpha_max is determined may be generalized. For example, an example embodiment may keep alpha_max at zero for a few frames (e.g. for a few frames after no motion is detected) to confirm by evaluation that motion blur would not occur.

The feature of restricting the maximum increase of alpha per frame ((d) above) is also an improvement. In some conventional techniques, at the first non-motion frame, alpha may increase abruptly from a low value to a high value. This change is undesirable for at least two reasons. First, it does not minimize noise variance. For example, the motion frames preceding the first non-motion frame may include significant amounts of noise because TNR may not have significantly reduced the noise in those motion frames in order to avoid ghosting. Using a high value of alpha in the next frame immediately succeeding the motion frames practically replacing the current frame with the previous frame's noisy images, would not reduce noise. Second, the abrupt large change can produce more ghosting from the residual motions which the motion rejection logic using SAD and alpha calculations may fail to remove. The ghosting would remain for long as it would stick to TNR outputs as long as little motion is detected.

In some embodiments, a scheduling to keep alpha increase from increasing too fast so that noise suppression performance can be maintained or improved may be determined as shown below. For example, $$\text{alpha}(t)=\min(\text{alpha\_hat}(t),\text{alpha}(t-1)+\text{alpha\_increase\_threshold}) \quad \text{(Eq. V3)}$$

where alpha_hat(t) is the original alpha value calculated with SAD and the alpha_increase_threshold is a predetermined maximum per frame increase in alpha. Another example may be to use a faction of alpha increase calculated with SAD:

$$\text{alpha}(t)=\min(\text{alpha\_hat}(t),\text{alpha}(t-1)+C*(\text{alpha\_hat}(t)-\text{alpha}(t-1))) \quad \text{(Eq. V4)}$$

where C is a constant typically in (0, 1]. In this manner (e.g., by relating the change in alpha to a previous value of alpha), the TNR can be run multiple times and it would also help ghosting from the few first frames wash away as it takes longer for alpha to be close to 1. In other words, instead of applying full blending immediately, in some embodiments, the blending increase may be gradually applied, helping the algorithm to earn time to wash away ghosting.

This approach may require keeping alpha(t−1) in memory, which increases memory requirements and power consumption due to memory access. To reduce the memory for alpha( ), alpha(t) can be spatially downsampled, e.g. by 2×2 averaging. Also, embodiments may use reduced number of bits as the blending has been observed not to degrade image quality significantly with some degree of numerical precision reduction in alpha( ). For example, it has been observed that a downsampling from 10 bits to 8 bits or more conversion worked well without significantly degrading image quality.

Some example embodiments provide tuning controls to enable dynamic adaptation to environment by software ((e) above). Certain example embodiments add tuning controls to enable dynamic adaptation by software to the environment. In an embodiment, $\text{alpha}=\text{iir}*\max(0, 1-K*\text{SAD})$, where iir and K are the control parameters. The controls for the parameters are exposed and allow software to adapt the values dynamically in accordance with the environment. For example, higher iir and lower K can be set if noise is expected to be strong due to low lighting (and thus high digital gain) or more differences between frames due to motion or longer frame time. Additionally, other parameters, such as, for example, parameters for spatial bilateral filters (e.g., spatial sigma and range sigma, etc.) may be exposed for software configuration dynamically in a manner adaptive to the environment. For example, if noise is expected to be strong, e.g. by low lighting, the software may configure higher value of such parameters. Statistics generated by an ISP may be used to determine when and/or whether to tune the parameters. These parameters can be tuned separately or as presets.

FIG. 2B shows a more detailed block diagram view of a noise reduction system such as that in FIG. 2A, according to some example embodiments. The block diagram shows example interactions between ISP statistics block 224 and each of the spatial filter block 212, the alpha determining block 216, and the output combiner block 220 to adaptively control the noise reduction processing. The noise reduction system effectively operates to translate motion information to temporal filter strength and the action of the output combiner.

The input video from a camera or other source is received at the spatial filter block 212. At block 212, spatial filtering is applied. A 3×3 or 5×5 spatial kernel may be applied at every pixel of the input frame to generate a spatial filter output. The input frame may, but is not limited to, a noisy input frame. The purpose of this block is two-fold: spatial filtering reduces the noise in the input frame and hence increases the reliability of SAD metric which determines the motion quantity of a pixel, and, in addition, in some instances, the spatial filter output is fed into the combiner block. Some embodiments may not use spatial filtering, and in such embodiments, the input video may be input to block 214 without first having been processed by block 212. When spatial filtering is used on the input video, some embodiments may use a bilateral filter. As noted above, the use of a bilateral filter for spatial filtering in video noise suppression is an improvement over use of Wiener (or Gaussian/box) filters for noise suppression.

At block 214, the sum of absolute difference (SAD) is determined. In certain example embodiments, the SAD is used as a motion classification metric. The SAD values are computed between the spatially filtered frame and the previous output frame. A 3×3 spatial neighborhood of pixels may be considered while calculating SAD.

$$\text{SAD}p = \Sigma_{i=0}^{8} \text{abs}(SF(i) - PO(i)) \quad \text{(Eq. 1)}$$

where SF denotes a 3×3 neighborhood of pixel p in spatial filtered frame, and PO denotes a 3×3 neighborhood of pixel p in the previous output frame.

At block 216, a value is calculated for alpha. alpha is a parameter of a first order infinite impulse response (IIR) filter which combines a filtered previous output frame and current noisy input frame to generate a temporal filtered output (see equation 3 below). In certain example embodiments, the alpha value is computed as a function of SAD and external cues from the ISP and sensor data.

According to some embodiments, based on cues from the ISP, each frame may be categorized into one of a plurality of lighting conditions. In some embodiments, three different lighting conditions—bright, medium and low light in two viewing conditions—indoor and outdoor. Input noise levels and their visibility are highly dependent on ambient conditions. For example, lower light captures have higher noise levels and are particularly bothersome in indoor scenes. Alpha values may be calculated as a function of SAD as below, $$\text{alpha} = \frac{(Mpv - \min(Mpv, K*SAD))}{Mpv} \quad \text{(Eq. 2)}$$

where Mpv represents the maximum pixel value (e.g. which may depend on the number of bits used to represent one pixel), K represents a variable which depends on the lighting condition from ISP, and SAD represents the sum of absolute difference.

If a particular pixel has high motion then the correlation between the current pixel and co-located pixel in the previous frame would be less, which leads SAD values higher. K is a constant which affects the slope of above equation to get appropriate alpha values for all lighting conditions. An example graph is shown in FIG. 2C for this power-law relationship assuming typical K values for different lighting conditions.

An alternative formulation of the alpha calculation may be as shown equation (2)' below. Equation 2' is the same as Equation 2 except to having K normalized with respect to Mpv.

$$\text{alpha} = \max(0, 1 - K*SAD) \quad \text{(Eq. 2')}$$

In example embodiments however the calculation of alpha includes at least one of the (a)-(e) described above: (a) determining alpha across multiple channels rather than individually for each channel, (b) including a non-linear penalty for SAD in the calculation of alpha, (c) determining alpha to maximize noise reduction, (d) restricting the amount of change in alpha per frame, and (e) enabling dynamic adapting of alpha in response to the environment.

For example, with a quadratic penalty based on the SAD (as in (b) above), alpha can be calculated as shown in (2").

$$\text{alpha} = (0, 1 - K*SAD^2) \quad \text{(Eq. 2")}$$

With a quadratic penalty based on the SAD (as in (b) above) and with controllable parameters (as in (e) above), alpha can be calculated as shown in (2''').

$$\text{alpha} = iir + (0, 1 - K*SAD^2) \quad \text{(Eq. 2''')}$$

alpha originally calculated according to Eq. 2" or Eq. 2''' can also, in some embodiments, be modified according to one or more of Eqs. V1, V2, V3 and V4 described above.

A first order IIR filter 218 produces a temporally filtered output using the alpha value calculated in block 216. This produces an output y(t) by recursively applying alpha blending of current frame x(t) with previous temporally filtered frame y(t−1).

$$y(t) = \text{alpha} * y(t-1) + (1 - \text{alpha}) x(t) \quad \text{(Eq. 3)}$$

The output combiner block 220 blends the temporal filtered output y(t) with the spatial filtered output SF(t), to generate output z(t):

$$z(t) = \text{beta} * SF(t) + (1 - \text{beta}) y(t) \quad \text{(Eq. 4)}$$

where beta is the spatial contribution coefficient. In an embodiment, beta can be chosen adaptively to how much details are present in the area. In another embodiment, beta can be a function alpha, i.e. beta=F(alpha). For example, in some embodiments, beta=1−alpha. Or, beta can be a piecewise linear function of alpha. Typically, we would choose F( ) to be an non-decreasing function of alpha. In case of high alpha, the temporally filtered image is likely to have clean images so smaller blending of SF helps keep the details from the temporally filtered image while keeping contribution from potentially more blurred image from SF. The spatial contribution coefficient in the combiner 220 may also depend on the ambient conditions.

The delay block 222 may receive and hold the current input frame or the current spatially filtered frame and the current temporally filtered frame. The delay block 222 may operate to buffer these frames for one or more clock cycles and, subsequently when the next input frame is being processed in the noise reduction pipeline, supply the buffered input frame or the buffered spatially filtered to the SAD calculation block 214 and also supply the buffered temporally filtered frame to the temporal filter block 218. In some embodiments, the delay block 222 may buffer only the current output frame (i.e. current temporally filtered frame), and operates to supply the buffered temporally filtered frame to both blocks 214 and 218 as required.

According to some example embodiments, external cues from the ISP can be used to improve the processing of the various blocks in the noise reduction circuit. As noise levels and their visibility are highly dependent on ambient conditions, lighting aware filter selection for noise reduction can perform better when compared to the one without the knowledge of the ambient light. In a typical digital camera system, both the image sensor and the ISP define the quality of the image/video. A typical ISP consists of many modules such as: 3A (Auto exposure, Auto focus & Auto white balance), flicker correction, lens shading etc. These modules process the captured image from the sensor and generate statistics. The statistics from these modules are typically collected by the ISP statistics engine which can be accessed by other hardware or software processing blocks. Statistics from 3A such as, for example, lux, exposure values, white balancing gains (e.g., WB0, WB1, WB2 & WB3 are for R, Gr, Gb and B channels respectively) and correlated color temperature (CCT) are useful to distinguish the ambient lighting conditions. In addition, information about the processing inside the ISP is useful to adapt the noise reduction to the noise level visibility.

In an example embodiment, using clustering on the ISP statistics, one or more of the following characteristics of ambient lighting are identified—light sources (e.g., natural sun light, artificial light), scenes (e.g., indoor, outdoor) and lighting levels (e.g., low, medium, bright). By analyzing multiple captures (e.g. mobile captures) under various (possibly differing) conditions, some example embodiments are able to capture the variation in noise levels as well as their visibility. This classification based on the ISP data helps the noise reduction algorithm to choose between different filter settings for various noise levels.

FIG. 2D shows an example when mapped according to the CCT values and blue channel white balancing gain (WB3), respective samples from indoor—outdoor scenes cluster significantly apart. The cluster 231 of samples in the figure shows indoor captures, and cluster 232 of samples show outdoor captures. Thus, such clustering can be used to differentiate between indoor and outdoor video captures for purposes of noise suppression.

An important point to note is that although this analysis which is used to drive the adaptation of the noise reduction method is computationally complex, it is performed off-line. This analysis can be performed upfront and hence does not contribute to the complexity of the real-time algorithm.

Certain example embodiments provide a scalable complexity in the noise reduction mechanism. The noise reduction mechanism described above can be broken down into two parts—a) filter adaptation and b) actual filtering. In one simplification, for example, in the pipeline shown in FIG. 2B, the blocks 212, 214, 216, 220, 222 and 224 form parts of the adaptation (e.g. configuring the filter) and the block 218 can be termed to be the filtering part. Block 224 may not contribute to the real-time complexity as it is computed off-line. The complexity of the noise reduction method can hence be scaled by carefully turning the adaptation on/off; this enables implementation on devices with very little computational resources. In addition, this scalable complexity method can be used to control power consumption by the algorithm when it is run on mobile devices which are power constrained. Note that there may be a trade-off between noise reduction quality and complexity and the optimal tradeoff would depend on the ambient lighting conditions as well. For example, in indoor scenes, the visibility and the levels of noise might allow for lowering the complexity of the noise reduction mechanism. In addition, this control can be exposed as a user-selectable option.

FIG. 2E shows several mechanisms of scalable complexity that can be used, for example, in a mobile capture of video input; in the first row, for each video frame in the mobile capture, the adaptation is tuned off for selected pixels (shown as white circles); for the rest of the pixels (shown as dark circles), both adaptation as well as filtering operations are computed. The white pixels borrow the adaptation parameters from the nearest dark pixels. Although only three simple patterns are shown for improving scalability, other patterns are possible and are contemplated within embodiments. The second row in the figure, termed temporal pattern, shows scalable complexity which can be achieved temporally (over multiple frames), where a vertical patch of the current video frame has both adaptation and filtering turned on (again, shown as dark circles) while the rest of the frame borrows the same parameters from co-located pixels of the previous frames and performs only the filtering. This patch is then slid across the frame so that at the end of N frames, all pixels have been refreshed (their adaptation is completed), as shown in the second row of FIG. 2E. By using the mechanisms described above, various levels of complexity can be traded off with a consequent loss in quality.

Example Noise Reduction Process

FIG. 2F shows an example process 240 for noise reduction in video input, according to some example embodiments. The process 240 may be performed by any of, the SoC 100, the GPU cloud 120, or the noise reduction pipelines shown in FIGS. 2A and 2B.

After entering process 240, at operation 242, an input video frame x(t) is received at a noise reduction pipeline. For example, the input frame may be received at the spatial filter block 212. In some embodiments, before being received at the spatial filter block 212, the input frame may be processed in an ISP (e.g. ISP 106), where the system may analyze the frame to obtain statistics that can be used to control certain processing steps in the noise reduction process. Frame x(t) is a frame from a sequence of n frames x(1) . . . x(t−1), x(t), x(t+1) . . . x(n).

At operation 244, the input video frame x(t) is spatially filtered to generate SF(t). Many types of spatial filters can be used. In some embodiments, a Wiener filter (or Gaussian/box filter) may be used. In some other embodiments a bilateral filter may be used. The example bilateral filter may be configured to use a pixel neighborhood of 3×3 or 5×5 for averaging. Spatial filtering in example embodiments is also described above in relation to FIG. 2A and block 212 in FIG. 2B.

At operation 246 one or more metrics are calculated to detect motion. In some example embodiments, the SAD between SF(t) and a previous frame is calculated. For example, the SAD may be calculated between the current frame and the immediately preceding frame. In some embodiments, for example, the SAD is calculated respectively for each pixel between SF(t) and SF(t−1). In other embodiments, the SAD may be calculated between SF(t) and y(t−1) (y(t−1) being the temporally filtered previous frame), or between x(t) and any of x(t−1), y(t−1) or SF(t−1) (respectively, unfiltered previous frame, temporally filtered previous frame and spatially filtered previous frame). It should also be noted that in some embodiments the SAD (or other motion detection metric) calculation may not be limited to the immediately preceding frame of x(t). Difference metric (e.g. SAD) calculation for detecting motion in example embodiments is also described above in relation to FIG. 2A and block 214 in FIG. 2B.

At operation 248, a value is calculated for a blending factor that determined the proportion with which the current frame is blended with the previous frame. In the example embodiments, the blending factor is referred to simply as alpha. According to embodiments, the alpha is calculated so that at least one of the following is satisfied: alpha across multiple channels, rather than for each individual channel such as RGB; alpha is calculated to include a non-linear penalty for SAD; alpha is calculated such that it maximizes noise reduction; alpha is calculated so that the change in its value is capped at a predetermined threshold; and the calculation alpha can be controlled by software in accordance with the environment. alpha calculation for blending current and previous frames in example embodiments is also described above in relation to FIG. 2A and block 216 in FIG. 2B.

At operation 250, temporal filtering is performed. According to some embodiments, the temporal filtering is performed according to a first order IIR filter using the alpha value determined at operation 248. Equation (3) above, provides for calculating the current temporally filtered frame y(t) based upon the previous temporally filtered frame y(t−1) (which may be obtained from a delay buffer in a memory) and the current frame (x(t) or SF(t)), and the alpha value determined for the current frame. This operation is also referred to as a blending of the current frame and the previous frame in accordance with the blending factor. Temporal filtering in example embodiments is also described above in relation to FIG. 2A and block 218 in FIG. 2B.

At operation 252, an output frame is generated. The output frame z(t) is generated by blending the current temporally filtered frame y(t) and the current frame (x(t) and/or SF(t)). The forming of the output frame z(t) from SF(t) and y(t) may be performed according to equation (4). The blending is based on a blending factor beta. The combining of the temporally filtered frame with the input frame or spatially filtered frame in example embodiments is also described above in relation to block 220 in FIG. 2B.

At operation 254, the generated frame is output. The output frame can, as described in relation to FIGS. 2A and 2B, be sent an encoder to be encoded in a selected video format before being transmitted over a network or other communication infrastructure. The output frame may also, or alternatively, be provided to one or more display devices for display, and/or may be provided to an application being executed on any processor (e.g. CPU or GPU).

At the completion of operation 254, process 240 completes for the input video frame x(t).

Process 240 above was described as including a spatial filtering of the input video frame. In some embodiments, there may be no spatial filtering step and the input video may directly be processed for calculating the difference values for detecting motion. The remainder of the process may be the same, except that there is no spatially filtered frame derived from the input video and thus it is not used in the blending described above in relation to operation 254.

Although the noise reduction pipelines shown in the FIGS. 1A-C and 2A-B, and the process described in relation to FIG. 2F, may be described in the context of processing unit and certain hardware components, these pipelines and process may also be performed by custom circuitry, or by a combination of CPU, GPU, custom circuitry and/or a program. Persons of ordinary skill in the art will understand that any system that performs, for example, methods 240 is within the scope and spirit of embodiments of the present invention.

A Parallel Processing Architecture for Noise Reduction in Video

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 3:
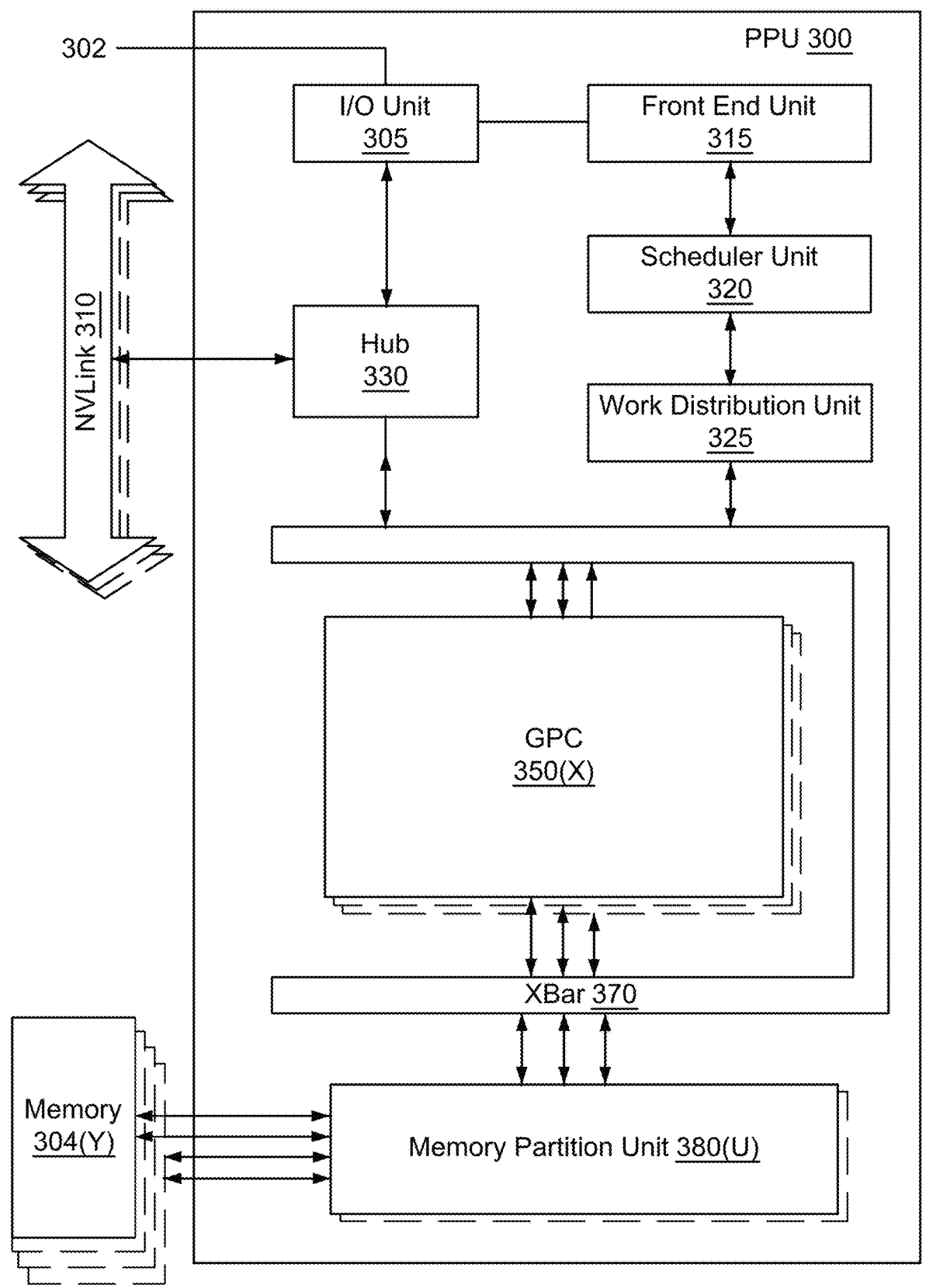
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
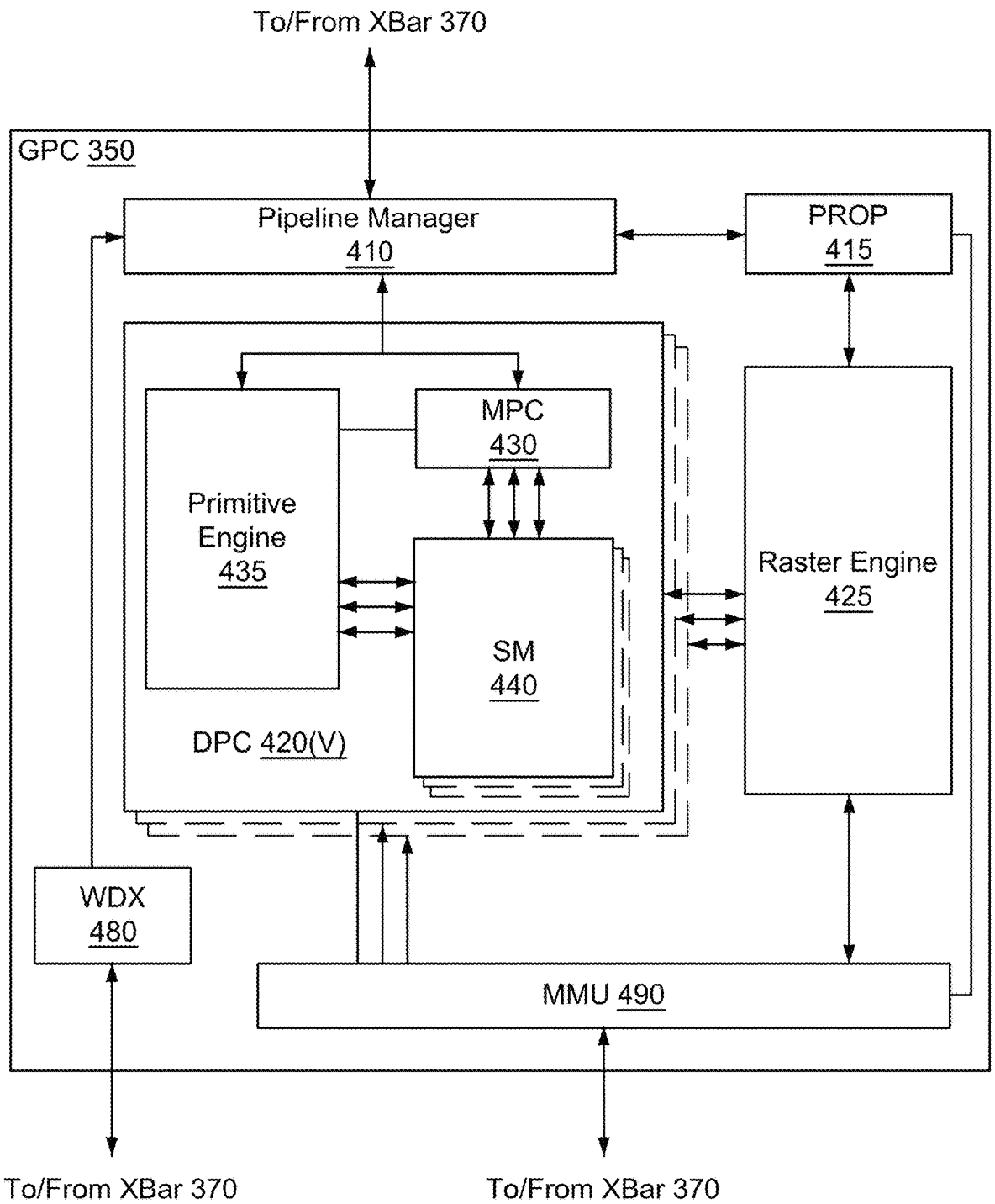
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
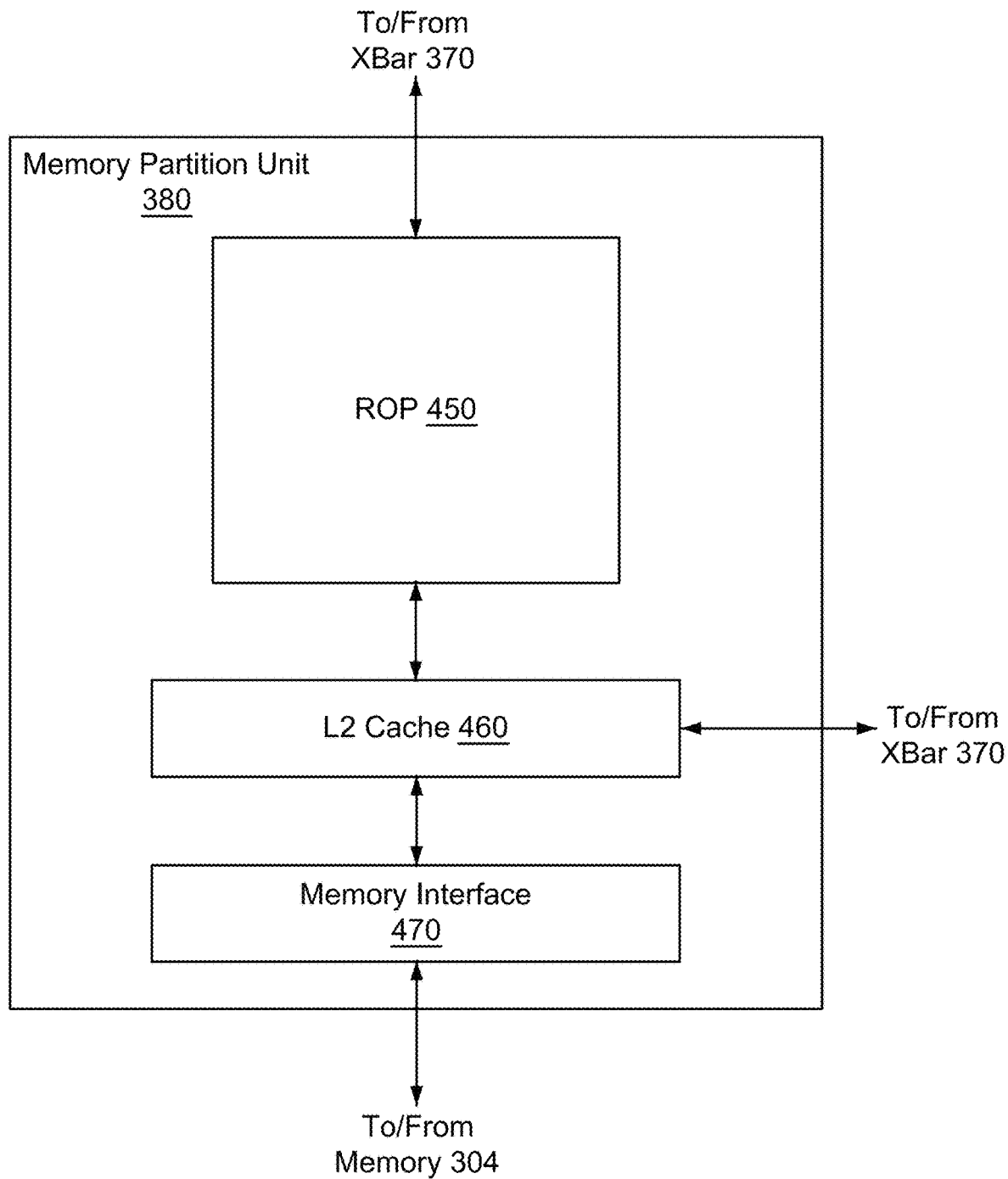
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
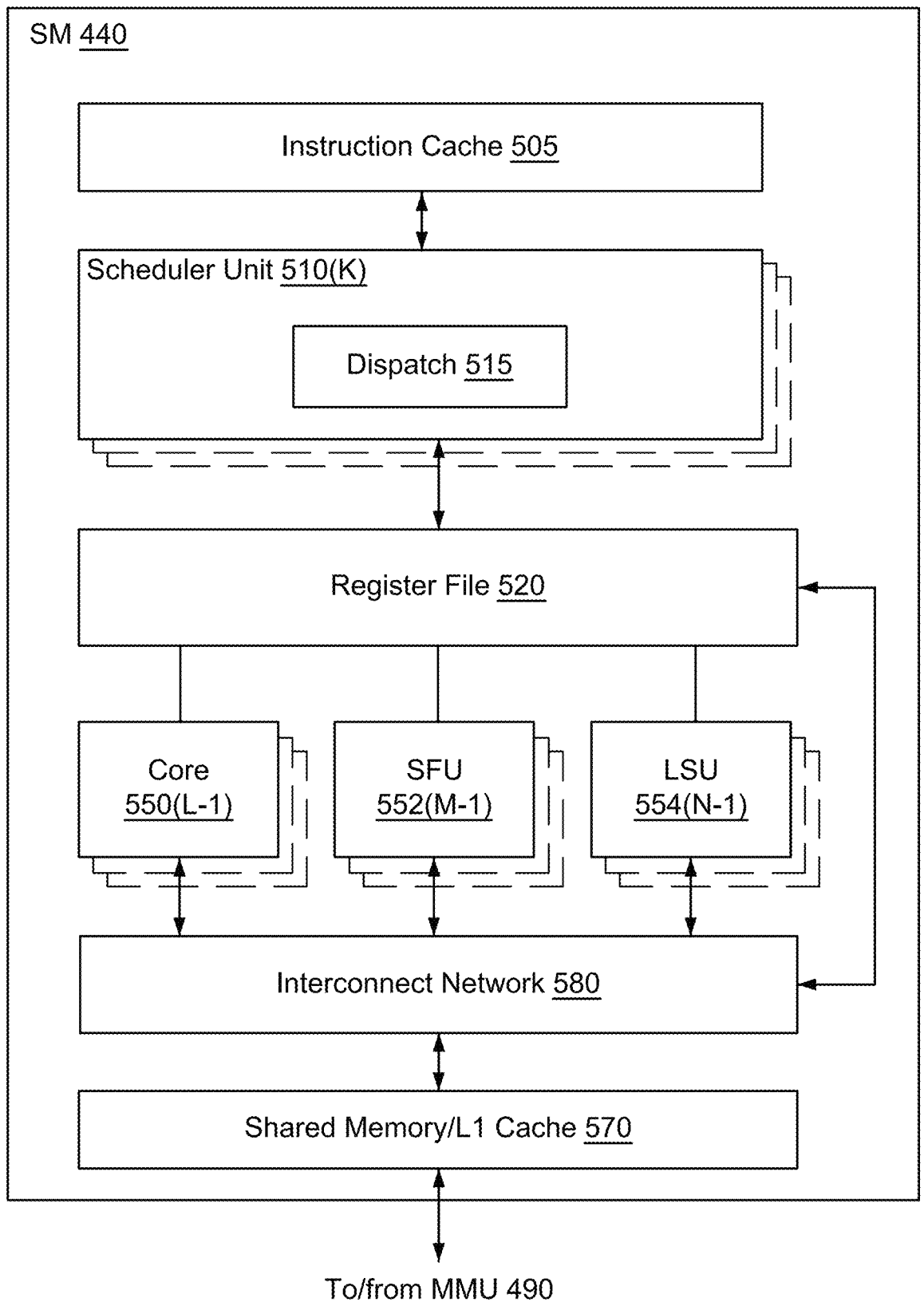
FIG. 5A illustrates the streaming multiprocessor of FIG. 4A, in accordance with an embodiment.

FIG. 5A illustrates the streaming multiprocessor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
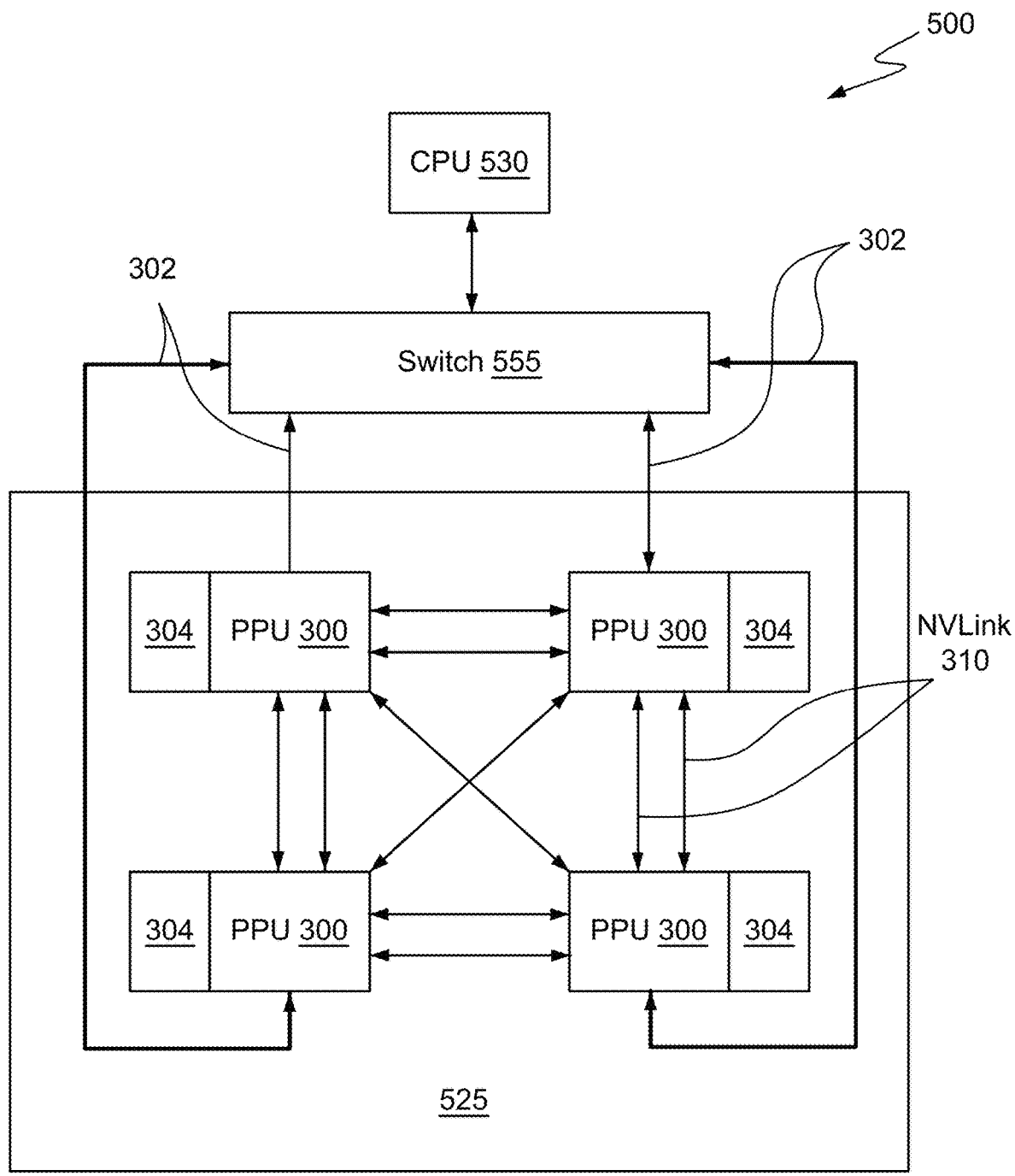
FIG. 5B is a conceptual diagram of a processing system implemented using the parallel processing unit (PPU) of FIG. 3, in accordance with an embodiment.

FIG. 5B is a conceptual diagram of a processing system 500 implemented using the PPU 300 of FIG. 3, in accordance with an embodiment. The exemplary system 500 may be configured to implement the method 240 shown in FIG. 2F and/or the pipeline illustrated in any of FIGS. 1A-C and 2A-B. The processing system 500 includes a CPU 530, switch 555, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 555 interfaces between the interconnect 302 and the CPU 530. The PPUs 300, memories 304, and NVLinks 310 may be situated on a single semiconductor platform to form a parallel processing module 525. In an embodiment, the switch 555 supports two or more protocols to interface between various different connections and/or links.

In another embodiment (not shown), the NVLink 310 provides one or more high-speed communication links between each of the PPUs 300 and the CPU 530 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 555 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 555. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 555, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
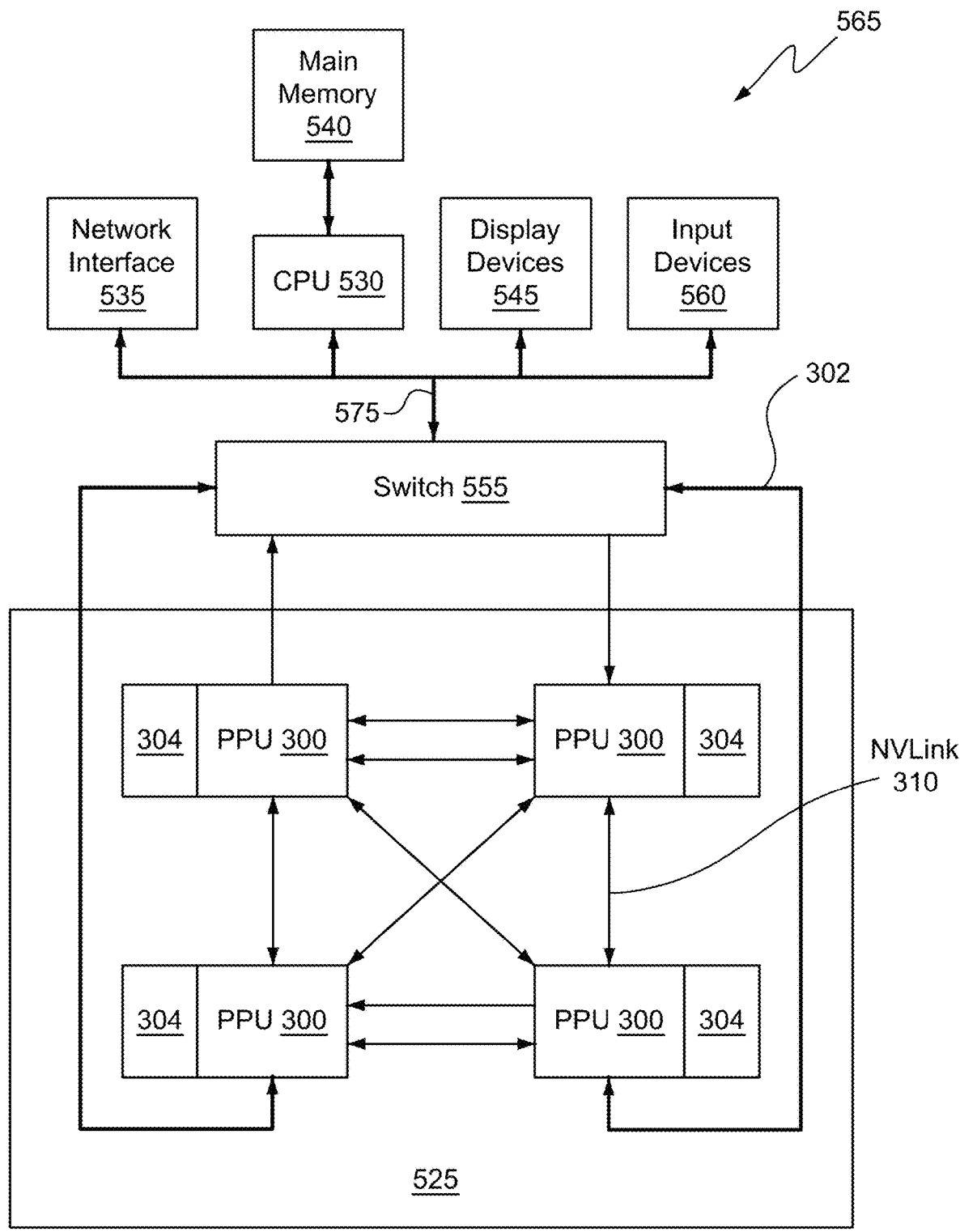
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 240 shown in FIG. 2F.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
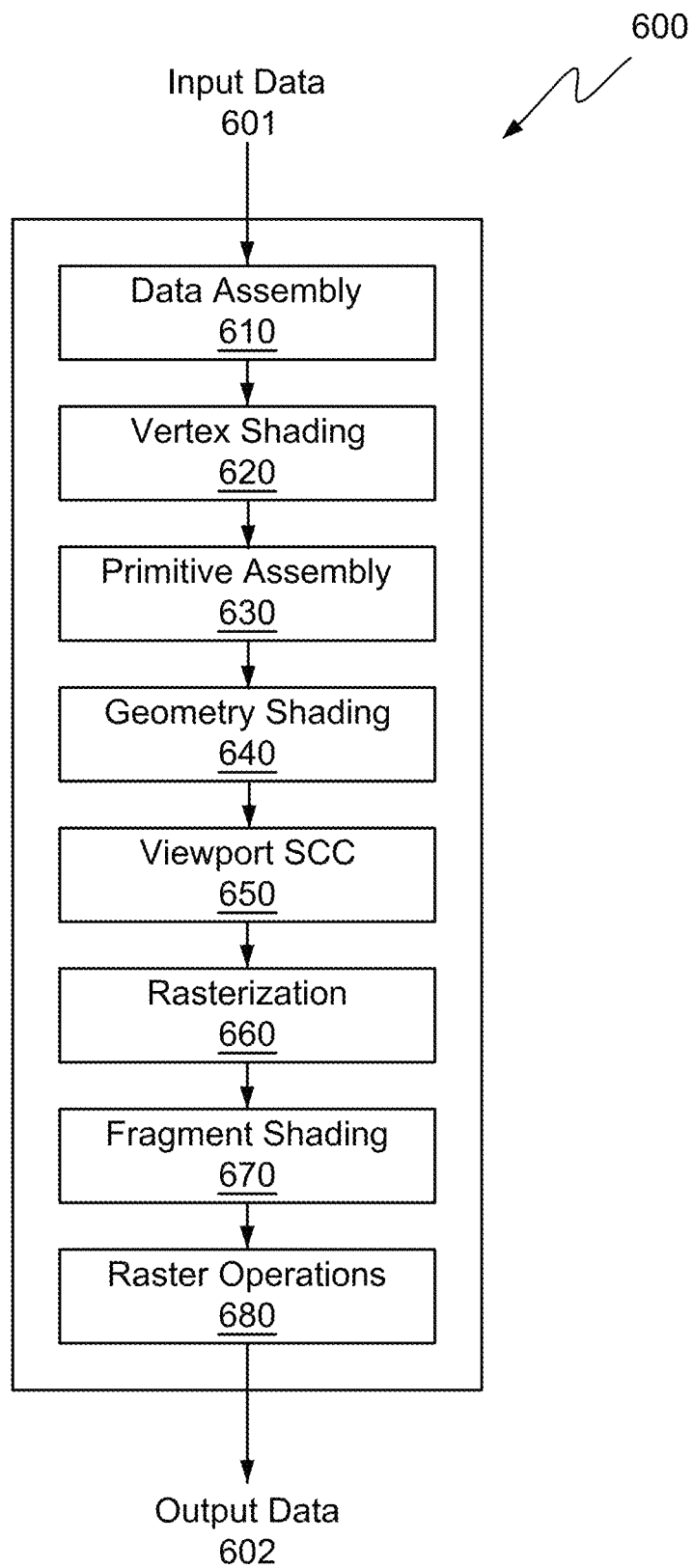
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Example Technical Advantages of Some Embodiments

Certain example embodiments provide for improved video by temporally or spatio-temporally processing video frames in a motion-adaptive manner.

Compared with conventional approaches to video noise reduction, example embodiments improve the accuracy and efficiency of temporal noise reduction and anti-ghosting achieved. Very noisy applications often invalidate the assumption underlying conventional approaches that big differences from previous frames usually does not come from noise. Such noisy applications may include, for example, intelligent video analytics and automotives, but are not limited thereto. Example embodiments of this invention offer better denoising and anti-ghosting tradeoff characteristics by improving the evaluation of the motion and determining the blending factor used in combining the current and previous frames by engaging one or more of the improvements selected from multiple methods to make the blending factor estimation more robust, a method to minimize noise variance, and a method to reduce ghosting. Importantly, these improvements require only marginal increases in computational complexity.

Example embodiments also improve the processing efficiency of the noise reduction pipeline by providing higher quality noise reduction without requiring sophisticated computationally-expensive motion estimation techniques to distinguish motion in frames. Some embodiments provide for performing the noise reduction based primarily on selected portions of a frame rather than the entire frame in order to improve scalability of the noise processing pipeline. Some embodiments also provide for reducing memory associated overhead by selectively downscaling and/or using reduced precision for some purposes.

Certain example embodiments of this invention enhance the image quality of cameras by reducing temporal noise, while keeping the complexity low and ghosting artifact to a low level. Whereas conventional video noise reduction techniques are notoriously ineffective in low light conditions, initial results of some example embodiments obtain about 10 dB SNR gain. The improvement may be beneficial for mobile and embedded devices and applications, such as, for example, NVIDIA Shield Tablets, and even more significant in intelligent video analytics and automotive applications that must address sensor noise in night scenes. Embodiments may also be used to improve the quality of streaming video applications.

Numerous modifications and variations of the present invention are possible in light of the above teachings. It is therefore to be understood that within the scope of the appended claims, the invention may be practiced otherwise than as specifically described herein.

What is claimed is:

1. A method of video noise reduction comprising:
   determining a difference metric for a frame of a sequence of video frames;
   determining, using the determined difference metric, a blending factor for blending the frame with another frame of the sequence, wherein the determining the blending factor includes at least one of (a) determining the blending factor jointly for a plurality of color channels, (b) non-linearly associating the determined difference metric with the blending factor, (c) restricting the determined blending factor to a maximum value determined according to a noise variance in the another frame, (d) restricting the determined blending factor to a maximum value based on a previous blending factor, or (e) changing a value of the blending factor according to one or more dynamically configurable coefficients;
   blending the frame and the another frame according to the determined blending factor;
   spatially processing the frame to reduce noise; and
   combining the spatially processed frame with the blended frame to generate an output frame for transmitting.

2. The method according to claim 1, wherein the spatially processing comprises spatially processing using a bilateral filter.

3. The method according to claim 1, wherein the combining the spatially processed frame with the blended frame is based upon the blending factor.

4. The method according to claim 1, wherein the determining the blending factor includes determining the blending factor jointly for a plurality of color channels.

5. The method according to claim 4, wherein the determining the blending factor further includes determining the blending factor jointly for each of red, green and blue color channels in an RGB color format of the sequence of video frames or for each of luma and chroma color channels in an YUV color format of the sequence of video frames.

6. The method according to claim 1, wherein the determining the blending factor includes non-linearly associating the determined difference metric with the blending factor.

7. The method according to claim 6, wherein the determining the blending factor further includes incorporating a quadratic or higher-order term of the determined difference factor in the determined blending factor.

8. The method according to claim 1, wherein the determining the blending factor includes restricting the determined blending factor to a maximum value determined according to a noise variance in the another frame.

9. The method according to claim 8, wherein the determining the blending factor includes restricting the determined blending factor to a maximum value determined according to a ratio of noise variances in the another frame and the frame.

10. The method according to claim 9, further comprising accessing a memory to store and/or to retrieve the noise valiances in downsampled form and/or in lower precision form.

11. The method according to claim 1, wherein the determining the blending factor includes restricting the determined blending factor to a maximum value based on a previous blending factor.

12. The method according to claim 11, further comprising accessing a memory to store and/or to retrieve a previous blending factor in downsampled form and/or in lower precision form.

13. The method according to claim 12, wherein the determining the blending factor includes restricting the determined blending factor to a maximum value based on said previous blending factor and a difference between the current blending factor and the previous blending factor.

14. The method according to claim 1, wherein the determining the blending factor includes changing a value of the blending factor according to one or more dynamically configurable coefficients.

15. The method according to claim 14, wherein the changing is performed automatically in response to detection of predetermined conditions in statistics determined by an image signal processor.

16. The method according to claim 1, wherein determining the blending factor further includes clustering the input video frame according to statistics from an image signal processor and further determining the blending factor in accordance with the clustering.

17. The method according to claim 1, wherein the determining the difference metric and the determining the blending factor are performed for only some pixels of the input video frame, and wherein the some pixels are determined according to a predetermined pattern configuration.

18. A system comprising at least one graphics processing unit (GPU) configured to receive a sequence of video frames from a video producer and perform video noise reduction operations comprising:
determining a difference metric for a frame of the sequence of video frames;
determining, using the determined difference metric, a blending factor for blending the frame with another frame of the sequence, wherein the determining the blending factor includes at least one of (a) determining the blending factor jointly for a plurality of color channels, (b) non-linearly associating the determined difference metric with the blending factor, (c) restricting the determined blending factor to a maximum value determined according to a noise variance in the another frame, (d) restricting the determined blending factor to a maximum value based on a previous blending factor, or (e) changing a value of the blending factor according to one or more dynamically configurable coefficients;
blending the frame and the another frame according to the determined blending factor;
spatially processing the frame to reduce noise; and
combining the spatially processed frame with the blended frame to generate an output frame for transmitting.

19. The system according to claim 18, wherein the system is a system-on-chip further comprises an image signal processor.

20. A non-transitory computer readable storage medium storing instructions that, when executed by at least one processor, causes the at least one processor to perform operations comprising:
determining a difference metric for a frame of a sequence of video frames;
determining, using the determined difference metric, a blending factor for blending the frame with another frame of the sequence, wherein the determining the blending factor includes (a) determining the blending factor jointly for a plurality of color channels and/or (b) non-linearly associating the determined difference metric with the blending factor and/or (c) restricting the determined blending factor to a maximum value determined according to a noise variance in the another frame and/or (d) restricting the determined blending factor to a maximum value based on a previous blending factor and/or (e) changing a value of the blending factor according to one or more dynamically configurable coefficients;
blending the frame and the another frame according to the determined blending factor;
spatially processing the frame to reduce noise; and
combining the spatially processed frame with the blended frame to generate an output frame for transmitting.

21. A method of video noise reduction comprising:
determining a difference metric for a frame of a sequence of video frames;
determining, using the determined difference metric, a blending factor for blending the frame with another frame of the sequence, wherein the determining the blending factor includes at least one of (a) non-linearly associating the determined difference metric with the blending factor and incorporating a quadratic or higher-order term of the determined difference metric in the determined blending factor, (b) restricting the determined blending factor to a maximum value determined according to a ratio of noise variance in the another frame and the frame, (c) restricting the determined blending factor to a maximum value based on a previous blending factor and accessing a memory to store and/or to retrieve a previous blending factor in downsampled form and/or in lower precision form, or (d) changing a value of the blending factor according to one or more dynamically configurable coefficients automatically in response to detection of predetermined conditions in statistics determined by an image signal processor; and blending the frame and the another frame according to the determined blending factor.

22. A system comprising at least one graphics processing unit (GPU) configured to receive a sequence of video frames from a video producer and perform video noise reduction operations comprising:

determining a difference metric for a frame of a sequence of video frames;

determining, using the determined difference metric, a blending factor for blending the frame with another frame of the sequence, wherein the determining the blending factor includes at least one of (a) non-linearly associating the determined difference metric with the blending factor and incorporating a quadratic or higher-order term of the determined difference metric in the determined blending factor, (b) restricting the determined blending factor to a maximum value determined according to a ratio of noise variance in the another frame and the frame, (c) restricting the determined blending factor to a maximum value based on a previous blending factor and accessing a memory to store and/or to retrieve a previous blending factor in downsampled form and/or in lower precision form, or (d) changing a value of the blending factor according to one or more dynamically configurable coefficients automatically in response to detection of predetermined conditions in statistics determined by an image signal processor; and blending the frame and the another frame according to the determined blending factor.

* * * * *